March 19, 1968  D. R. JOHNSON ET AL  3,373,598

THERMAL GRAVIMETRIC ANALYZER

Filed Nov. 12, 1964

INVENTORS
DONALD R. JOHNSON
RAYMOND W. TABELING

BY Herbert M. Wolfson

ATTORNEY

United States Patent Office 3,373,598
Patented Mar. 19, 1968

3,373,598
THERMAL GRAVIMETRIC ANALYZER
Donald R. Johnson and Raymond W. Tabeling, Wilmington, Del., assignors to E. I. du Pont de Nemours and Company, Wilmington, Del., a corporation of Delaware
Filed Nov. 12, 1964, Ser. No. 410,437
3 Claims. (Cl. 73—15)

ABSTRACT OF THE DISCLOSURE

An apparatus for measuring the changing weight of a sample as a function of time and temperature comprising a support, a chamber mounted on the support, a weight-responsive means mounted in the chamber having at least one horizontally disposed arm adapted to receive a sample at the extremity, means responsive to the weight-responsive means for measuring the temperature of the sample and openings in the chamber adapted to pass a gas over the sample in a substantially horizontal direction. The horizontally disposed arm preferably comprises a first member adapted to receive the sample at one of its ends and a second member of similar material connected to the opposite end of the first member, the connection being effected by an expansion clip which compensates for any change in length of the first member with changes in temperature.

---

The present invention relates to a weight measuring system and, more particularly, to an apparatus and method for measuring the changes in the weight of samples due to the temperature changes thereof.

A device that measures the weight changes of a sample under investigation at a controlled temperature or under a linearly increasing temperature is known as a thermal gravimetric analyzer. Basically, thermal gravimetric analysis involves measuring the weight of a sample as a function of temperature or time or both. In many cases, the change in weight of the sample may also be affected by the flow of a gas, e.g., oxygen, air, etc. over the sample. Thermal gravimetric analysis is useful for determining the thermal decomposition of organic and inorganic compounds, solid-state reactions, roasting, and calcination of minerals, thermochemical reactions of ceramics and ceramic-coated metals, pyrolysis of coal, petroleum and wood, the determination of moisture, volatiles and ash, the corrosion of metals, the absorption, adsorption and desorption properties of materials, the rates of evaporation and sublimation of materials, their latent heats and the thermal degradation of natural and synthetic materials.

Heretofore, thermal gravimetric analysis has involved the use of a thermal balance in which the pans containing the samples are hung vertically. The pans may be suspended, usually by wires or the like, from horizontally-disposed arms as in U.S. Patent No. 3,045,472; or they may be suspended using a suspension spring as in U.S. Patent No. 3,055,206. In any case, the pans must be a substance distance away from the actual weighing mechanism in order for the sample to be immersed in a furnace or other heating means. After the sample is immersed in the furnace, gases are passed into the chamber containing the sample. The turbulence created by the gas passing downwardly and upwardly, or the downward force if gas is passed downwardly and then out of the chamber will tend to introduce substantial errors in the measured weight of the sample.

It is an object of the present invention to provide a thermal gravimetric analytical device of extremely high accuracy. Other objects will appear hereinafter.

The objects are accomplished in a weight-measuring apparatus that comprises a support, a chamber mounted on the support, weight-responsive means mounted in the chamber having at least one beam or arm which arm is adapted to receive a sample at the extremity, means responsive to the weight-responsive means for indicating the changing weight of the sample, means for heating the sample, means for measuring the temperature of the sample, openings in the chamber adapted to pass a gas into and out of the chamber, by the improvement wherein the arm of the weight-responsive means is horizontally disposed and the openings in the chamber are adapted to pass gas over the sample in a substantially horizontal direction.

A further improvement that is important in achieving the best results with the device of this invention lies in a specially designed horizontally disposed arm. Specifically, this arm is composed of two rod-like members, a first member adapted to receive the sample at one of its ends. At its opposite end, this first member is connected to a second member of a similar material. The connection of the two members is effected by an expansion clip, the clip being a substantially tubular horizontal member fastened at the end more remote from the sample to the first member and fastened at its opposite end to the second member. The portion between the two ends of the expansion clip is free to expand and contract. However, the length of the clip and its coefficient of expansion is such as to substantially compensate for any change in the length of the first member with changes in temperature.

The apparatus has several advantages over those hitherto used. For example, it permits the use of small samples which are convenient and which minimize problems that tend to arise from uneven heat transfer. The device also has the capability for rapid temperature scanning together with accurate sample temperature indication. Furthermore, the apparatus is simple to operate and compact in size. Notably absent from this apparatus are the vertical hanging tubes and the hang-down members which are associated with prior thermal gravimetric analysis devices.

The invention will be more particularly described with reference to the drawing in which.

Figure 1:
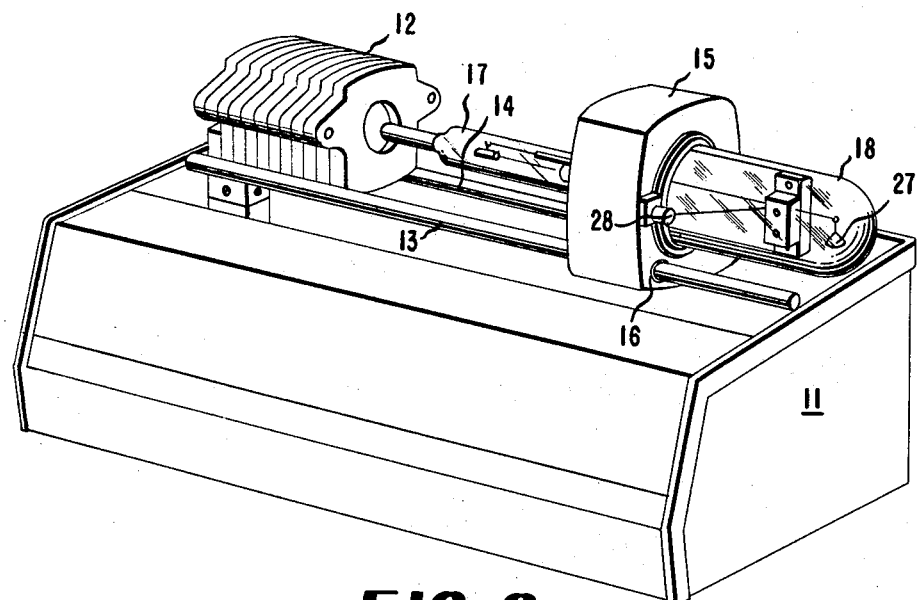
FIGURE 1 is a view in perspective of the entire apparatus.
Figure 2:
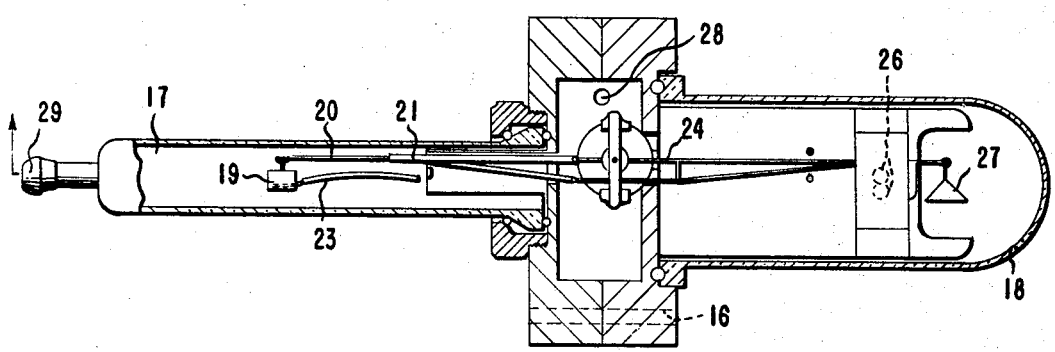
FIGURE 2 is a side elevation of a portion of the apparatus.

Referring to FIGURES 1 and 2, 11 represents the support. A furnace 12 is mounted on support 11. Tracks 13 and 14 are also mounted on the support. The balance housing 15 is adapted by the presence of track guides such as 16 to be slidably mounted on tracks 13 and 14. Affixed to the balance housing are chambers 17 and 18. The sample boat 19, which is usually cyindrical is mounted at the end of beam 20. Beam 20 is usually made of quartz but may be made of any heat-resistant material. Beam 20 is connected to the rear beam 21 through the expansion clip 22. The rear beam 21 is usually made of the same material as beam 20. A so-called floating thermocouple 23 is mounted in very close proximity to the sample in sample boat 19.

Extending into chamber 18 is the rear beam 24. The overall beam position is maintained in the horizontal reference position by an optically activated servo-loop which employs a light source, not shown, focused on two photovoltaic cells 26 through a signal flag, not shown, having a slit aperture, suspended from the balance beam 24. A counter weight pan 27 is attached to the end of the beam 24 in the cold section 18 of the assembly.

In operation, the housing 15 is slid on tracks 13 and 14 towards the furnace 12 in a manner such that the sample boat 19 is within the furnace area. The furnace 12 may be a known resistance furnace having a low thermal mass for rapid heating. The balance may have been previously adjusted by the use of the proper tare 27 so that it is in balance when the sample is first immersed in the furnace. At the same time, gas is made to flow into the enclosure 17 through opening 28. The sample boat 19 is usually cylindrical to permit the gas to flow through it with a minimum obstruction. The gas then flows out opening 29 removing the products of decomposition with it. As the weight of the sample in boat 19 decreases, the beam becomes out of balance. Tare pan 27 tends to deflect downwardly from its neutral position permitting an increased amount of light to strike the photovoltaic cells 26, the amount of light being directly related to the change in weight of the sample. The photovoltaic cells 26 produce an electric signal which is also related to the change in weight of the sample. By systems well known in the art, e.g., those disclosed in U.S. Patents Nos. 3,061,027, 3,074,270, or the like, this current may be amplified and then applied as a voltage to restraining means such as a torque motor or the like to reposition the balance beam substantially in the reference or equilibrium position. The amount of current necessary to provide the restoring force, when measured across a fixed resistor as in U.S. Patent No. 2,754,109, provides a voltage drop which is a function of the changes in the weight of the sample, i.e., is a measure of the variation in the magnitude that was responsible for the displacement of the beam from equilibruim.

Figure 3:
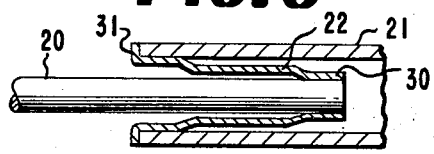
FIGURE 3 is a detailed plan view of the expansion clip connecting the two arm or beam members.

Since the member 20 of the beam must be immersed in the furnace there will be a tendency for this member to expand or lengthen with the increase in temperature. Such an increase in length will tend to produce a false result as to the weight of the sample in boat 19, the change in weight that is measured being a function of the weight times the moment arm of the beam. To prevent a change in the length of the arm due to increased temperature the expansion clip 22 is used. As shown in detail in FIGURE 3, this clip, which may be made of stainless steel or other material having a higher coefficient of expansion than the material of the beam, particularly member 20, is crimped at the so-called cold end 30 about the hot member 20. At the so-called hot end 31 of the clip 22, it is expanded to engage the cold member 21 of the beam. Between the crimped end 30 and the expanded end 31 clip 22 is free to expand and contract. By selecting an appropriate length for this free area, the expansion or lengthening of member 20 with increased temperature can be completely compensated for by the accompanying expansion of the clip 22 so that the moment arm which produces the weight recorded by the device, the moment arm being the sum of the lengths of members 20 and 21, is maintained substantially constant.

*Example*

The previously described apparatus was used to analyze the decomposition of calcium oxalate monohydrate in oxidizing and nonoxidizing atmospheres. The procedural decomposition temperatures were measured using a chromel-alumel thermocouple and are listed in the following table:

| Reaction | Temperature (° C.) Using 1,000 ml./min. of nitrogen | Temperature (° C.) Using 1,000 ml./min. of air |
|---|---|---|
| Water | 113-207 | 123-207 |
| Carbon monoxide | 405-523 | 400-482 |
| Carbon dioxide | 626-793 | 621-798 |

Despite a rapid scanning rate of 15° C. per minute, the values obtained agree very well with those in the literature indicating improved heat transfer, improved sample temperature indication and minimum turbulence due to gas flow in the apparatus of the invention.

It is to be understood that this invention is not limited to the specific embodiment thereof described herein, but is meant to include changes that will be apparent to those skilled in the art without departing from the scope of this invention as defined by the appended claims.

What is claimed is:

1. In an apparatus for measuring the changing weight of a sample as a function of temperature and time comprising a support, a chamber mounted on said support, weight-responsive means mounted in said chamber having at least one arm, said arm adapted to receive a sample at its extremity, means responsive to said weight-responsive means for indicating the said weight of said sample, means for heating said chamber, means for measuring the temperature of said sample, openings in said chamber adapted to pass a gas into and out of said chamber, the improvement wherein said arm of said weight-responsive means is horizontally disposed and said openings are adapted to pass said gas over said sample in a substantially horizontal direction.

2. The improvement of claim 1 wherein said horizontally disposed arm is composed of two substantially horizontally disposed members, a first member adapted to receive said sample at one end, said first member connected at its opposite end to a second member, an expansion clip adapted to connect said first and second members, said clip being a substantially horizontal member fastened at the end more remote from the sample to said first member and fastened at its opposite end to said second member, the portion between said ends of said clip being free to expand and contract, the length of said free portion of said clip and the coefficient of expansion of said clip being such as to substantially compensate for any change in the length of said first member with change in temperature.

3. The improvement of claim 1 wherein said horizontally disposed arm is composed of two substantially horizontally disposed rod-like members, a first member adapted to receive said sample at one end, said first member connected at its opposite end to a second member, an expansion clip adapted to connect said first and second members, said clip being a substantially tubular horizontal member fastened at the end more remote from the sample to said first member and fastened at its opposite end to said second member, the portion between said ends of said clip being free to expand and contract, the length of said free portion of said clip and the coefficient of expansion of said clip being such as to substantially compensate for any change in the length of said first member with change in temperature.

References Cited

UNITED STATES PATENTS 3,045,472 7/1962 Paulik _____ 73—15
3,292,417 12/1966 Hayden _____ 73—15

OTHER REFERENCES

Cahn, Lee et al.: Aerodynamic Forces in Thermogravimetry Analytical Chemistry (35) (11): pp. 1729-31, October 1963.

JAMES J. GILL, *Primary Examiner.*

E. E. SCOTT, *Assistant Examiner.*